US011511232B2

(12) United States Patent
Perreault (10) Patent No.: US 11,511,232 B2
(45) Date of Patent: Nov. 29, 2022

(54) FILTRATION CASSETTE RESIDING IN BAG AND METHODS OF USING SAME

(71) Applicant: REPLIGEN CORPORATION, Waltham, MA (US)

(72) Inventor: Mark A. Perreault, Hudson, MA (US)

(73) Assignee: REPLIGEN CORPORATION, Waltham, MA (US)

( * ) Notice: Subject to any disclaimer, the term of this patent is extended or adjusted under 35 U.S.C. 154(b) by 50 days.

(21) Appl. No.: 17/103,244

(22) Filed: Nov. 24, 2020

(65) Prior Publication Data

US 2021/0197125 A1 Jul. 1, 2021

Related U.S. Application Data

(60) Provisional application No. 62/955,541, filed on Dec. 31, 2019.

(51) Int. Cl.
  *B01D 63/08* (2006.01)
  *B01D 65/00* (2006.01)

(52) U.S. Cl.
  CPC ......... *B01D 63/084* (2013.01); *B01D 65/003* (2013.01); *B01D 2313/04* (2013.01); *B01D 2313/20* (2013.01); *B01D 2315/10* (2013.01); *B01D 2319/025* (2013.01)

(58) Field of Classification Search
  CPC ................ B01D 63/084; B01D 65/003; B01D 2313/04; B01D 2313/20; B01D 2315/10; B01D 2319/025; B01D 65/08; B01D 2313/50; B01D 2201/307
  See application file for complete search history.

(56) References Cited

U.S. PATENT DOCUMENTS

| | | | |
|---|---|---|---|
| 2002/0139741 A1 | 10/2002 | Kopf | |
| 2005/0126981 A1* | 6/2005 | Connors | B01D 63/081 210/488 |
| 2007/0056894 A1 | 3/2007 | Connors | |
| 2007/0138082 A1 | 6/2007 | Connors et al. | |
| 2007/0241048 A1 | 10/2007 | Hunt | |
| 2013/0105411 A1* | 5/2013 | Loser | B01D 29/41 210/323.1 |
| 2013/0186841 A1* | 7/2013 | Johnson | B01D 36/001 210/256 |
| 2019/0374882 A1* | 12/2019 | Wetter | B01D 46/2403 |
| 2020/0171439 A1 | 6/2020 | Perreault | |

OTHER PUBLICATIONS

"Polysulfone" (Wikipedia) 1994, Entire document, especially "Structure-property relationship," "references" <https://en.wikipedia.org/wiki/Polysulfone>.
International Search Report and Written Opinion, dated Feb. 24, 2021 for PCT application PCT/US2020/062002 filed Nov. 24, 2020.

\* cited by examiner

Primary Examiner — Pranav N Patel
(74) Attorney, Agent, or Firm — KDB Firm PLLC (57) ABSTRACT

Tangential flow filtration systems utilizing flexible bags for permeate collection are provided.

19 Claims, 7 Drawing Sheets

FILTRATION CASSETTE RESIDING IN BAG AND METHODS OF USING SAME

PRIORITY

This application claims the benefit of priority under 35 USC § 119 to U.S. Provisional Patent Application Ser. No. 62/955,541, filed Dec. 31, 2019, which is incorporated by reference herein in its entirety and for all purposes.

FIELD OF THE DISCLOSURE

The present disclosure relates to tangential flow filtration systems and methods.

BACKGROUND

Tangential flow filtration (TFF), also known as cross-flow filtration (CFF), is used throughout industry to separate or purify materials fluid suspensions or solutions based on their size differences. In a TFF system, a fluid feed comprising various molecular or particulate species flows into a filtration vessel in a direction perpendicular to a permeable membrane. In the filtration vessel, the feed is separated into two component flows: a permeate flow (also referred to as a filtrate) that passes through the membrane and includes certain species from the feed; and a retentate flow which does not pass through the membrane and includes any species that did not pass into the permeate.

TFF systems have several advantages over conventional direct-flow filtration systems, including generally lower rates of fouling due to filter cake formation for comparable membrane fluxes.

TFF systems are commonly implemented using plate-and-frame or cassette designs. These designs typically incorporate a plurality of flat sheet membranes arranged between external flat plates and manifolds. In use, a fluid feed is passed through the inlet of the manifold into the cassette, and tangentially to the first (upper) surfaces of the membranes. The permeate flow passes through the membranes then through the cassette into a dedicated permeate channel of the manifold, while the retentate does not cross the membrane and passes into a separate retentate channel of the manifold.

Conventionally, cassettes are made by interleaving multiple layers of membranes with pressure-sensitive adhesives (PSA) and screen mesh and, optionally, securing some or all of the layers together, e.g., by encapsulation using a silicone or urethane polymer. TFF cassettes generally include apertures or other features for interfacing with the manifold. Cassette designs can be susceptible to leaking when layers are mis-aligned with one-another or with the manifold interface. Thus, in use, cassettes are often sandwiched between flat plates or gaskets to seal the cassettes against such leakage.

In recent years, interest has grown in single-use aseptic TFF cassette systems for bioprocessing applications. Single use systems offer several potential advantages over multi-use systems, including lower costs for individual components and simplified workflows that do not include reprocessing and sterilization of cassettes. However, aseptic single use cassettes are often provided in formats that require some user assembly, e.g., assembly of a TFF "stack" comprising the cassette and flat plates for sealing the cassette. These designs are straightforward and effective, but some potential exists for failure due to defects in the plates or user error in their assembly. Reduction of these risks could result in cost savings and avert losses due to cassette failures.

SUMMARY

The present disclosure provides single-use TFF cassettes and methods for making and using them which offer, through the use of a cassette sealed in a bag for permeate collection, reduced risk of failure and reduced user assembly.

In one aspect, this disclosure relates to a tangential flow filtration system comprising a tangential flow filtration cassette disposed within a vessel, optionally a flexible vessel, such that a permeate flow from the cassette flows into the vessel. In various embodiments, the tangential flow filtration cassette comprises a plurality of interleaved permeate and retentate channels separated from one another by filtration membranes. The retentate channels in these embodiments are in fluid communication with a feed port and a retentate port but are fluidly sealed from the vessel, while the permeate channels are fluidly sealed from the feed and retentate ports but are in fluid communication with the vessel. In some instances, the retentate channel has a sealed edge to prevent fluid flows between the vessel and the retentate channel.

In another aspect, this disclosure relates to a tangential flow filtration cassette comprising a stack of interleaved layers defining at least one feed channel and at least one filtrate channel. The interleaved layers comprises a membrane having first and second elongate fenestrations disposed at first and second ends of the membrane. On one side of this membrane (referred to as a "first" side), a feed channel seal is disposed, defining an enclosed membrane area comprising the first and second elongate fenestrations. On the opposite side (the "second" side) first and second filtrate channel seals are disposed about the first and second elongate fenestrations, thereby sealing them. The stack also optionally includes (a) a feed screen that is sized to fit within the enclosed membrane area defined by the feed channel seal, and/or (b) a filtrate screen configured to fit outside of the first and/or second filtrate channel seals. In certain embodiments, the feed channel(s) is (are) fluidly sealed from an exterior of the cassette but is open to the first and second elongate fenestrations, while the filtrate channel(s) is (are) open to the exterior of the cassette but sealed from both the first and second elongate fenestrations.

In yet another aspect, this disclosure relates to a tangential flow filtration system comprising a tangential flow filtration cassette substantially as described above, as well as a flexible vessel enclosing at least a portion of the tangential flow filtration cassette, which flexible vessel includes a permeate outlet. The system also includes first and second end plates positioned to form a fluid-tight seal with at least one of the tangential flow filtration cassette and the flexible vessel. At least one of the first and second end plates defines a fluid inlet and a fluid outlet aligned with the elongate apertures of the tangential flow filtration cassette. The flexible vessel may also comprise a fluid connector that is reversibly connectable to a conduit for permeate.

In another aspect, this disclosure relates to a tangential flow filtration system that may include a vessel. A tangential flow filtration cassette may include a plurality of permeate channels. The tangential flow filtration cassette may be substantially enclosed within the vessel such that a permeate flow from the cassette flows from each end of the plurality of permeate channels into the vessel. The vessel may be elastically deformable. The tangential flow filtration cassette may include a plurality of interleaved retentate channels and permeate channels. The interleaved retentate and permeate channels may be separated by at least one filtration membrane. The retentate channels may be in fluid communication with a feed port and a retentate port of the tangential flow filtration cassette and are fluidly sealed from the vessel. The permeate channels may be in fluid communication with the vessel and are fluidly sealed from the feed port and retentate port. Each retentate channel may include sealed ends between the retentate channel and the vessel. The tangential flow filtration cassette may include a plurality of layered membranes. Each layered membrane may include two slotted fenestrations at opposing ends of each layered membrane. Alternating layered membranes may further include a seal disposed about each of the two slotted fenestrations. Alternating layered membranes may further include a seal disposed along opposing ends of each alternating layer outside of the two slotted fenestrations.

In another aspect, this disclosure relates to a tangential flow filtration cassette that may include a stack of interleaved layers defining at least one feed channel and at least one filtrate channel. The stack of interleaved layers may include a membrane include first and second elongate fenestrations disposed at first and second ends thereof. A feed channel seal may be disposed on a first side of the membrane. The feed channel seal may define an enclosed membrane area comprising the first and second elongate fenestrations. First and second filtrate channel seals may be disposed on a second side of the membrane opposite the first side. The first and second filtrate channel seals may be disposed about each of the first and second elongate fenestrations thereby sealing the first and second elongate fenestrations from the corresponding filtrate channel. The at least one feed channel may be fluidly sealed from an exterior of the cassette but may be open to each of the first and second elongate fenestrations, and the at least one filtrate channel may be open to the exterior of the cassette but sealed from both the first and second elongate fenestrations. A feed screen may be configured to substantially fill a volume of the enclosed membrane area defined by the feed channel seal. A filtrate screen may be configured to substantially fill a volume of the filtrate channel outside of the first and second filtrate channel seals.

In another aspect, this disclosure relates to a tangential flow filtration system that may include a tangential flow filtration cassette. A flexible vessel may enclose at least a portion of the tangential flow filtration cassette. The flexible vessel may include a permeate outlet. First and second end plates may be disposed about first and second sides of the tangential flow filtration cassette and the flexible vessel. The first and second end plates may be positioned to form a fluid-tight seal with at least one of the tangential flow filtration cassette and the flexible vessel. At least one of the first and second end plates may define a fluid inlet and a fluid outlet aligned with the elongate apertures of the tangential flow filtration cassette. The flexible vessel may include a fluid connector that is reversibly connectable to a conduit for permeate.

In another aspect, this disclosure relates to a tangential flow filtration cassette that may include a first membrane including a first side and a second side, the first membrane defining a first filtrate channel along the first side. A second membrane may be adjacent the second side of the first membrane, extending substantially parallel with the first membrane. The second membrane may define a retentate channel between the first membrane and the second membrane. The second membrane may define a second filtrate channel along a side of the second membrane external to the retentate channel. A first elongate fenestration may be along a first end of each of the first membrane and the second membrane. A second elongate fenestration may be along a second end of each of the first membrane and the second membrane. A retentate seal may be disposed about a perimeter of the retentate channel configured to fluidly seal the perimeter of the retentate channel from an external space of the cassette. A plurality of filtrate seals may be within the first filtrate channel and the second filtrate channel. The plurality of filtrate seals may be disposed about each of the first elongate fenestration and the second elongate fenestration of the first membrane and the second membrane. A flexible vessel may enclose the first membrane and the second membrane such that ends of the filtrate channel are open to the flexible vessel. The retentate channel may be fluidly sealed from an exterior of the cassette but is open to each of the first and second elongate fenestrations. The first and second filtrate channels may be open to the exterior of the cassette but sealed from both the first and second elongate fenestrations. A retentate screen may be configured to substantially fill a volume defined by the retentate seal. A plurality of filtrate screens may be configured to substantially fill a volume of each of the first and second filtrate channels outside of the plurality of filtrate seals. A tangential flow filtration system may include a tangential flow filtration cassette. A flexible vessel may enclose at least a portion of the tangential flow filtration cassette. The flexible vessel may include a permeate outlet. First and second end plates may be disposed about first and second sides of the tangential flow filtration cassette and the flexible vessel. The first and second end plates may be positioned to form a fluid-tight seal with at least one of the tangential flow filtration cassette and the flexible vessel. At least one of the first and second end plates may define a fluid inlet and a fluid outlet aligned with the first and second elongate fenestrations of the first and second membranes. The flexible vessel may include a fluid connector that is reversibly connectable to a conduit for permeate. A volume of the flexible vessel may include the first and second filtrate channels external to the plurality of filtrate seals.

In another aspect, a method of tangential flow filtration may include flowing a fluid into a feed inlet into a retentate channel. The fluid may flow within the retentate channel tangentially across at least one disposable membrane. The fluid may be filtered across the at least one membrane into a filtrate channel. A filtrate may be flowed along the filtrate channel and out an open end of the filtrate channel. The filtrate may be collected within a disposable flexible vessel. The fluid may be flowed from the retentate channel through an elongate fenestration of the at least one disposable membrane.

DETAILED DESCRIPTION

Cross-Flow Filtration Cassettes

The present disclosure relates to a cross-flow filtration cassette that utilizes membranes, screens, ports, and seals. The primary role of a membrane is to act as a permeable selective barrier composed of a semi-permeable polymeric film. Screens provide a flow path allowing fluid to move across the surface of the membrane from the feed to the retentate and away from the membrane in the filtrate. The screens may be made of woven polypropylene, although other woven or extruded meshes made of polyester, polyamide, nylon, polyetheretherketone (PEEK), and Teflon-based materials such as ethylene tetrafluoroethylene (ETFE), or blends of any of these materials, are contemplated and within the scope of the disclosure. Seals are comprised of pre-formed channel spacers, woven or extruded screens impregnated with a thermoplastic or thermoset creating a barrier within the flow path. Furthermore, seals may incorporate a plurality of ports blocked by a physical barrier comprising of a thermoset polymer and/or thermoplastic used to bond and encapsulate the alternating layers of membranes and channel seals. When so bound, the channel seals create defined fluid flow boundaries for the channels.

The present disclosure differs from existing cross-flow filtration cassette design by collecting the permeate in a flexible bag encompassing the cassette, which is made possible because fluid is able to flow between the permeate channels and a space outside of the cassette. This in turn is made possible by removing fluid seals that are normally integrated into permeate channels. By removing these seals, permeate (or filtrate) can flow out of each permeate channel into a vessel disposed about the cassette, such as a bag, as described below.

A filtration cassette of this disclosure may be used in a variety of small and large-scale applications requiring cross-flow filtration and may be particularly suitable in small and large scale pharmaceutical and biopharmaceutical filtration processes including, but not limited to, the production of vaccines, monoclonal antibodies, and patient-specific treatments.

Figure 1:
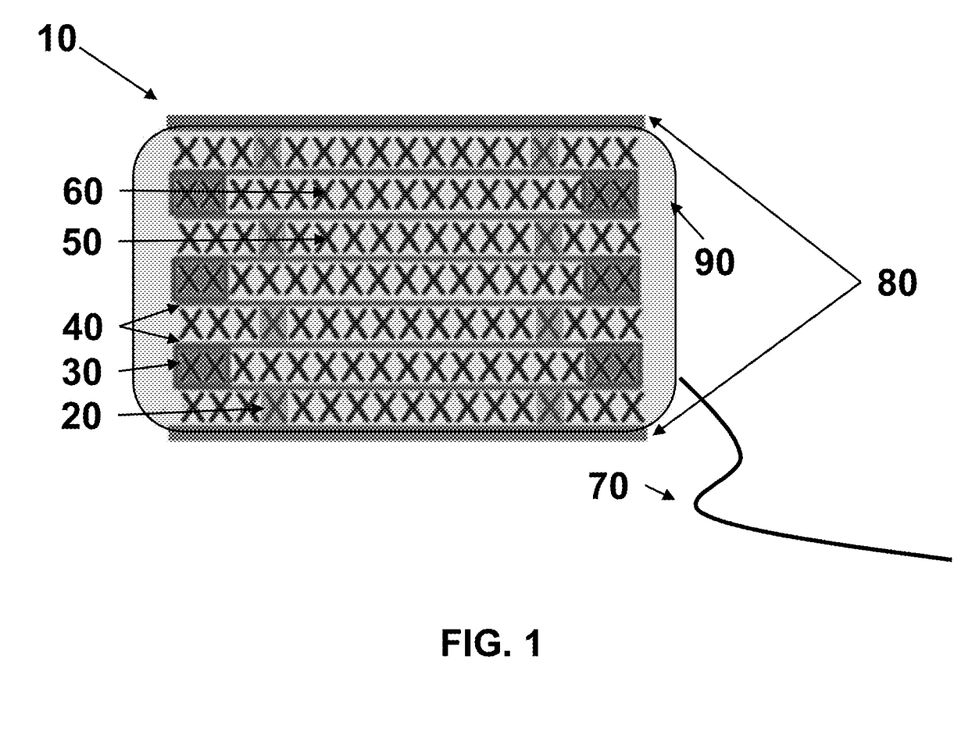
FIG. 1 depicts a cassette design according to an embodiment of the disclosure.

A cross-sectional view of one embodiment of a cross-flow filtration cassette channels with a simplified port design collecting permeate in a bag is generally shown in FIG. 1. Filtration cassette 10 includes one or more filtrate channel seals 20, one or more feed channel seals 30, and one or more membranes 40. The number of channel seals and membranes included in a filtration cassette can be influenced by the capacity requirements for the filtration cassette. In general, the number of membranes can be twice the number of feed channel seals. The number of filtrate channel seals can be equal to the number of feed channel seals or the number of feed channel seals plus one. However, a cassette can be constructed with only one membrane, one filtrate channel seal and one feed channel seal, or other numbers of membranes and screens.

The total number of membranes within a cassette can be from 1 to 1000 or more, preferably from 1 to 500, and more preferably from 1 to 250. The total number of feed channel seals within a cassette can be from 1 to 500 or more, preferably from 1 to 250, and more preferably from 1 to 125. The total number of filtrate channel seals within a cassette can also be from 1 to 500 or more, preferably from 1 to 250, and more preferably 1 to 125. For example, a small cassette can have 2 membranes, 1 feed channel seal and 2 filtrate channel seals. A 1× cassette can have 22 membranes, 11 feed channel seals and 12 filtrate channel seals. A 5× cassette can have 110 membranes, 55 feed channel seals and 56 filtrate channel seals. A 10× cassette can have 220 membranes, 110 feed channel seals and 111 filtrate channel seals. A 20× cassette can have 440 membranes, 220 feed channel seals and 221 filtrate channel seals, etc.

Membranes 40 are positioned between feed channel seals 30 and filtrate channel seals 20. Filtration cassette 10 also preferably includes one or more filtrate screens 50 inserted into the open interior volume of filtrate channel seals 20. Filtration cassette 10 can further include one or more feed screens 60, inserted into an open interior volume of feed channel seals 30. Preferably, each of the open interior volumes of the filtrate channel seals 20 and the feed channel seals 30 have one filtrate screen 50 or feed screen 60. The screens 50, 60 can fill the area defined by the membranes 40 and the seals 20, 30, while still facilitating the flow of feed or filtrate therethrough. The screens may also serve other purposes, such as that of an additional filtration means or preventing compression of the cassette by keeping the channel volume relatively constant. A thermoset or thermoplastic adhesive is optionally used to bind the alternating layers of filtrate channel seals 20, membranes 40, and feed channel seals 30. Filtrate is collected into the bag 90 and flows away from the cassette via collection tube 70. Filtration cassette 10 can, optionally or additionally, comprise one or two sealing end plates 80.

Channel height is defined primarily by the thickness of screens and/or feed channel seals 30 Channel height is preferably in the range of approximately 0.010 inches (about 0.25 mm) through approximately 0.10 inches (about 2.5 mm), although in other embodiments, channel heights can be as small as approximately 0.004 inches (about 0.1 mm) or as large as approximately 12 inches (about 30 cm). By adjusting the thickness of screens and/or channel seals 20 and 30, channel height may be selectively defined to within very tight tolerances.

Filtrate screen 50 and feed screen 60 may be made of woven polypropylene, although other woven or extruded meshes made of polyester, polyamide, nylon, polyetheretherketone (PEEK), and Teflon-based materials such as ethylene tetrafluoroethylene (ETFE), or blends of any of these materials, are contemplated and within the scope of the disclosure. Screens 50 and 60 can be die-cut, although other methods of manufacture, including machining, stamping, or molding, are contemplated and within the scope of the disclosure. In addition, the use of die-cut screens may reduce material handling during manufacturing and facilitate automated or robotic assembly. Filtrate screen 50 and feed screen 60 are optionally inserted in between the membrane layers 40. Screens 60 in the feed/retentate channel can create turbulence, which minimizes gel layer formation while improving fluid velocity at the membrane surface. If feed screen 60 is not used, the feed channel is left open, potentially increasing the likelihood of gel layer formation and reduced membrane flux. Filtrate screen 50 can also provide support for membrane 40 and act as an under drain to facilitate the flow of fluid out of filtration cassette 10.

In general, feed/retentate screen 60 acts as a turbulence promoter to minimize fouling while reducing the total fluid volume passing through a channel. A lesser flow, in turn, requires less pumping. In general, low viscosity fluids are better suited to channels with a relatively low channel height and screens, while high viscosity fluids are better suited to channels with a relatively high channel height with no screens or more open screens.

The thickness of feed screens, 60 can be greater than, less then, or substantially equal to the thicknesses of corresponding feed channel seals 30. Where thicknesses are equal, the screens 60 will not press onto the membranes 40, and the membranes 40 in turn will not substantially compress the screens 60. Alternatively, screens 60 are sized to "float" in the channel, i.e., screens 60 are each have a thickness that does not exceed the total channel height created by the combination of channel seal 30. A "floating" screen does not impinge on membrane 40 and may result in less debris build-up under the screen. In yet another configuration, screens 60 have a greater thickness than the channel seals 30 such that the screen is pressed into the membrane to mimic traditional cassette technology. Still In other embodiments, screens or turbulence promoters (not shown) may be molded into channel seals 30.

Figure 2:
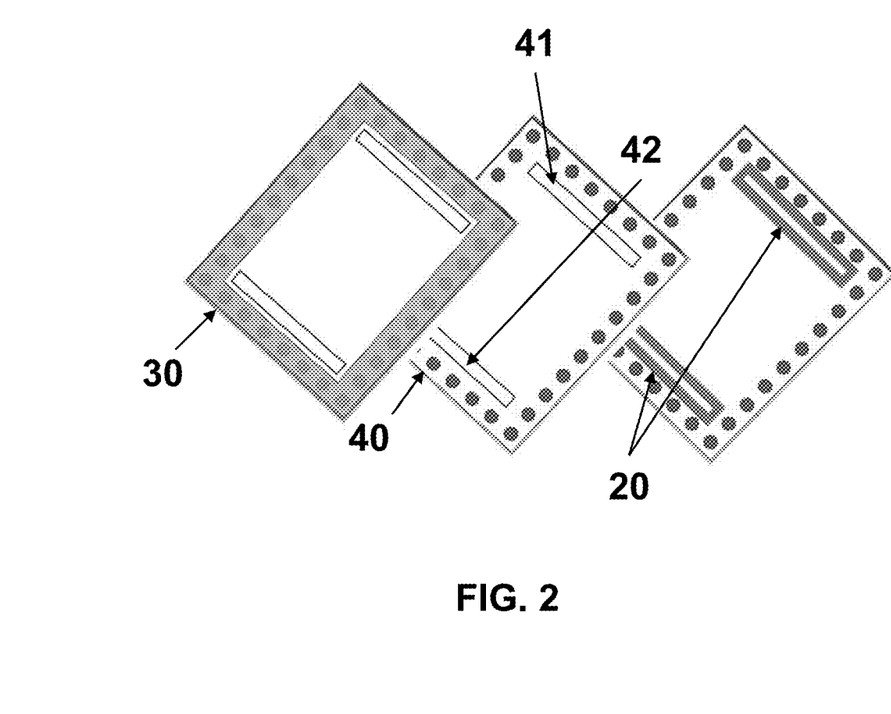
FIG. 2 depicts an exploded view of feed and filter channels according to an embodiment of the disclosure.

Turning to FIG. 2, each membrane 40 in filtration cassette 10 is substantially identical, and includes first and second ports or fenestrations 41, 42, to allow for feed and retentate flows through the cassette 10. Of course, different numbers and configurations of ports, including but not limited to having multiple feed and retentate ports, are contemplated and within the scope of this disclosure. By the same token, the ports or fenestrations may have any appropriate shape, including without limitation the elongated or rectangular shapes depicted in FIG. 2. While not wishing to be bound by any theory, the use of parallel rectangular or elongate ports 41, 42 depicted in FIG. 2 may be particularly desirable inasmuch as this configuration of elongated ports facilitates even fluid flows across all or part of the surface of membrane 40 within the feed channels.

Feed and filtrate channels in cassette 10 are defined by the positioning of the filtrate and feed seals 20, 30 relative to the ports 41, 42 there within. In filtrate channels, filtrate seals 20 are disposed about the ports 41, 42, fluidly sealing ports 41, 42 while allowing filtrate flows to escape the filtrate channel at the edges of the membrane 40. By contrast, feed seals 30 form a fluid seal about a perimeter of membrane 40, preventing fluid from entering or exiting the feed channel from exiting the channel except via the ports 41, 42 (or by passing across membrane 40). Filtrate channel seal 20 and feed channel seal 30 can be made of any suitable material, including without limitation a thermoset polymer.

Membrane 40 is typically made of a modified polyethersulfone or regenerated cellulose, although any semi-permeable sheet material, including but not limited to ultrafiltration, microporous, nanofiltration or reverse osmosis filters formed from polyvinylidene fluoride (PVDF), polysulfone, polyethersulfone, regenerated cellulose, polyamide, polypropylene, polyethylene, polytetrafluoroethylene, cellulose acetate, polyacrylonitrile, vinyl copolymer, polycarbonate, and blends of these materials, are contemplated and within the scope of the disclosure. Membranes 40 may be die-cut, although other methods of manufacture, including machining, stamping, or molding, are contemplated and within the scope of the disclosure. In addition, the use of die-cut membranes may reduce material handling during manufacturing, and facilitate automated or robotic assembly. The membrane pore size rating is preferably in the range of approximately 1,000 Dalton through approximately 1 micron, although in other embodiments, pore size ratings may be from less than approximately 100 Dalton to approximately 3 micron.

Filtration cassettes according to the present disclosure where permeate is collected in a bag are comparatively simpler than existing cassette designs, insofar as they do not require that permeate channels be sealed from the exterior of the cassette, nor that separate permeate ports or fenestrations be cut into the filtration membranes. This structural simplicity simplifies both cassette manufacture, as fewer materials are required for individual cassettes, and filtration system assembly, as described in greater detail below.

Sealed Single-Use TFF Cassettes

One group of embodiments in this disclosure relates to pre-assembled, single-use irradiated TFF cassette systems that differ from existing systems in their incorporation of end-plates and/or gasket structures that have previously been provided separately and assembled by end users. The embodiments described herein are advantageous in that they are closed systems, they eliminate at least one user assembly step prior to use and/or at least one disassembly step after use. Elimination of a disassembly step in particular may reduce end-user exposure to biohazardous materials captured by the filter during operation. Additionally, this design assures that the TFF cassette remains aseptically sealed and isolated from the environment, preventing contamination of the cassette.

Figure 3:
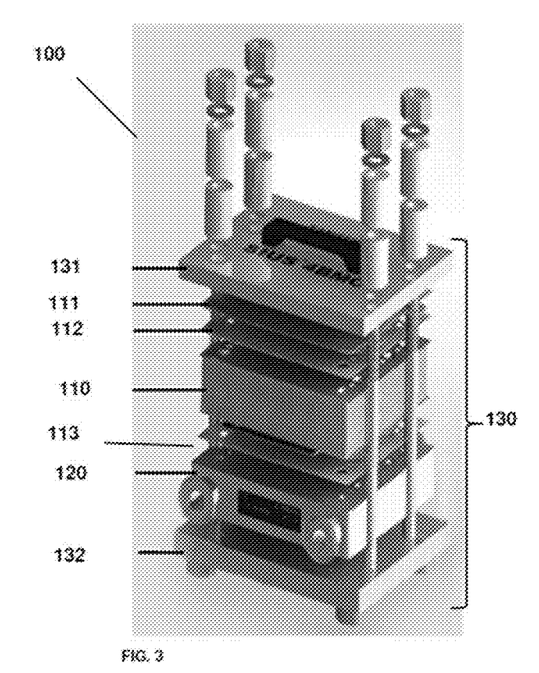
FIG. 3 depicts an exploded view of a conventional tangential flow filtration system according to accepted manufacturing methods.
Figure 4:
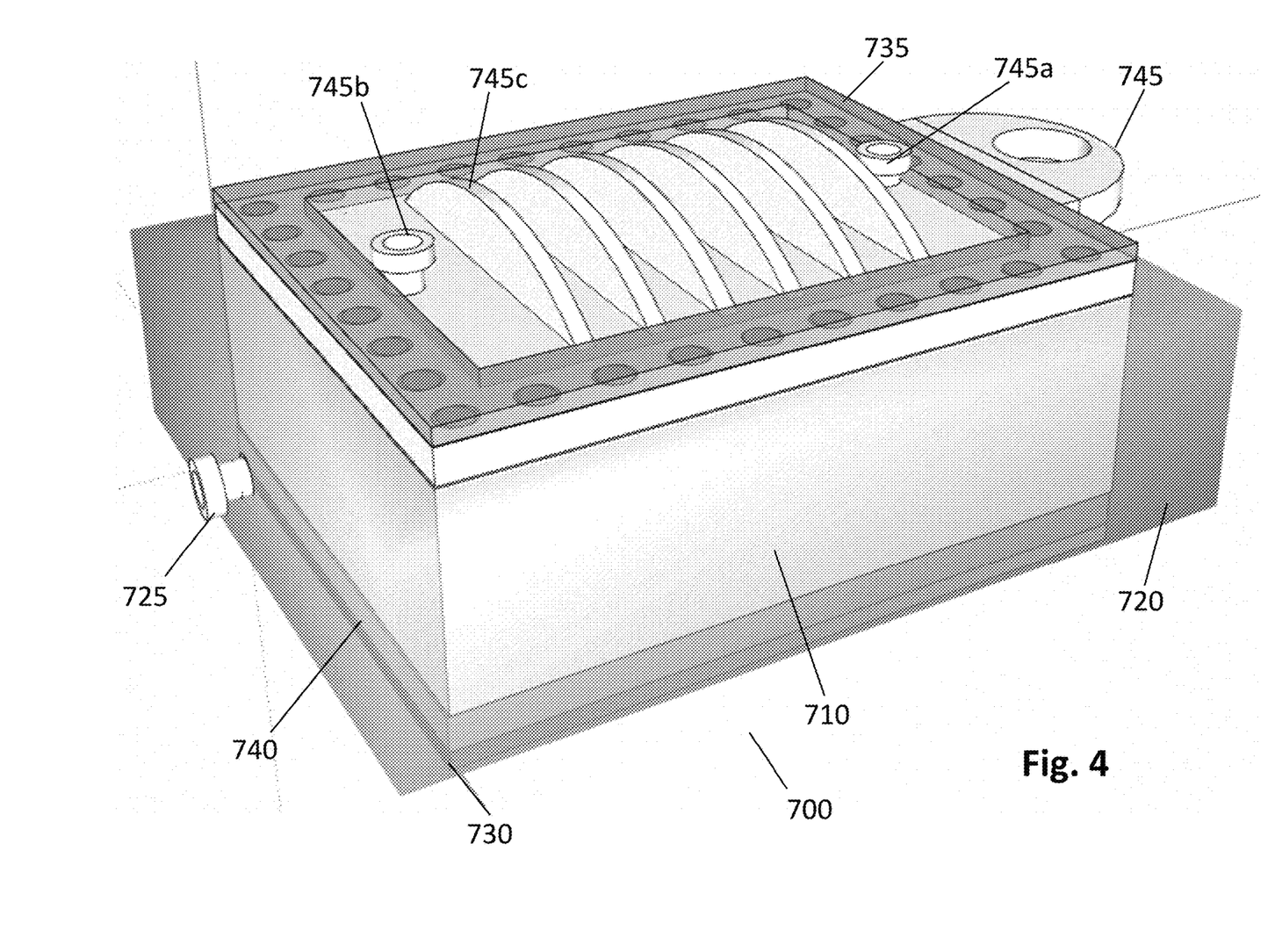
FIG. 4 depicts a first perspective view of a tangential flow filtration system according to an embodiment of the disclosure.
Figure 5:
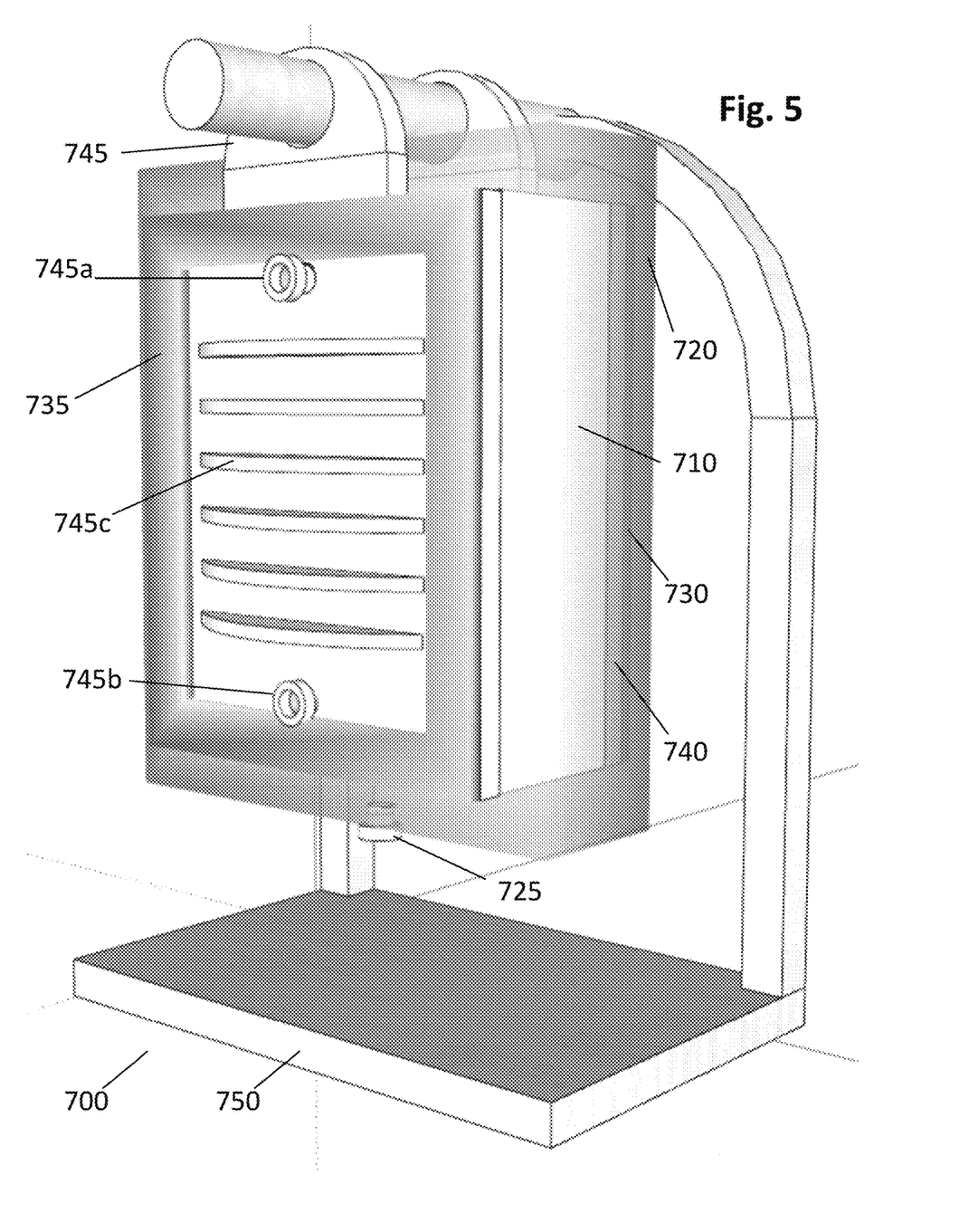
FIG. 5 depicts a first perspective view of a tangential flow filtration system according to an embodiment of the disclosure.
Figure 6:
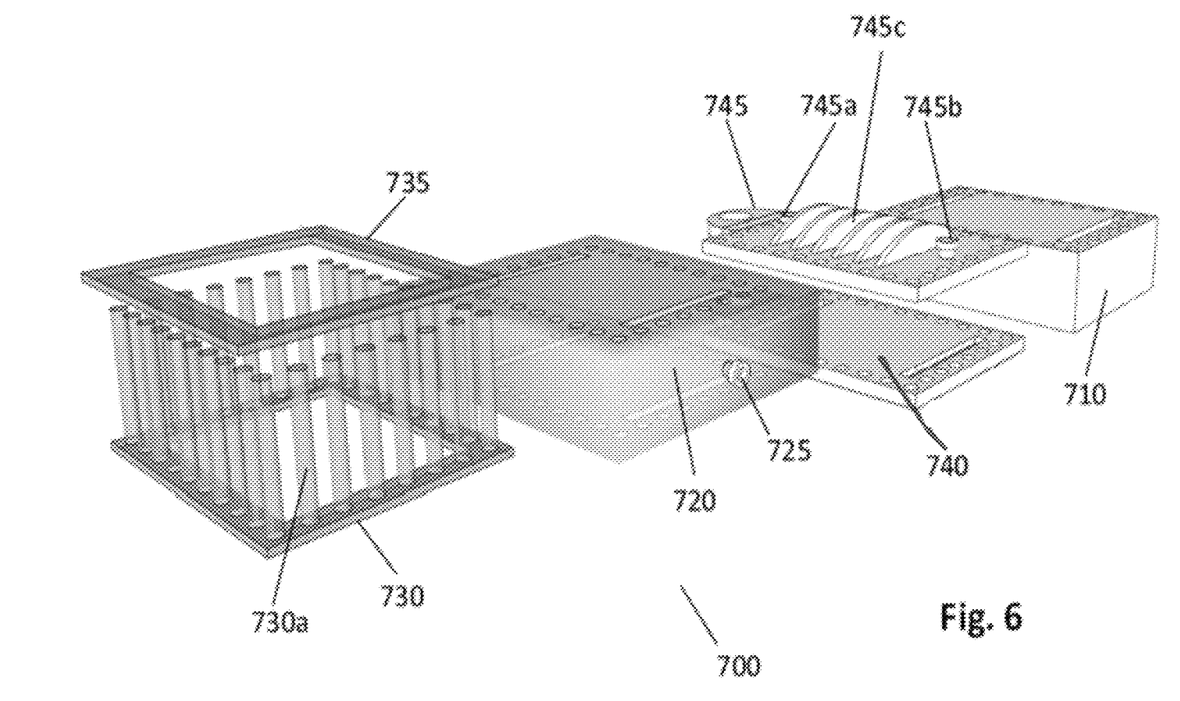
FIG. 6 depicts a perspective view of the elements of a cassette-in-bag system according to an embodiment of this disclosure.

FIG. 3 depicts a standard TFF system 100 which includes a TFF cassette 110, a filter plate insert 120, and a clamp 130 comprising a top plate 131 and a bottom plate 132. Between the top plate 131 and the TFF cassette 110 are disposed one or more of a flexible non-perforated flexible isolation plate 111 and an elastomeric gasket 112 comprising one or more ports to accommodate the flow of fluid there through. Between the TFF cassette 110 and the filter plate insert 120 another elastomeric gasket 113 is disposed. In this system, each of the elastomeric gaskets 112, 113 and the flexible isolation plate 111 ensure separation of feed, retentate and permeate flows and confine these flows to the cassette 110 and the filter plate insert 120. If the flexible isolation plate 111 and/or an elastomeric gasket 112, 113 is omitted or misaligned, fluid leakage and/or contamination may occur. Importantly, if the surface of the cassette is slightly irregular or not completely flat, the flexible isolation plate will remain sealed when no compressive force is applied to the cassette stack.

Cassette Residing in Bag

At present, the industry standard for deployment of tangential flow filtration cassettes involves the use of a horizontal clamp system such as the TangenX™ horizontal cassette clamp commercialized by Repligen Corporation (Waltham, Mass.). An example of a cassette clamp is provided in FIG. 3; the operation of horizontal clamp systems and their component parts are described above. Horizontal clamp systems have a number of advantages, but because these systems are typically assembled in-place by end users, the potential always exists for failures due to user errors in assembly.

One aspect of this disclosure relates to a novel cassette system for tangential flow filtration which differs from the current industry standard in several ways. First, in systems of the present disclosure permeate is collected in a disposable and/or flexible vessel, referred to herein as a "bag," which is disposed about an exterior of the filtration cassette.

By eliminating the rigid external shell currently used to contain permeate flows, system complexity (and potentially system cost) can be advantageously reduced. Second, systems of this disclosure route permeate flows separately from feed/retentate flows, rather than routing both permeate and feed/retentate flows through a single flow manifold as is commonly done in current systems. Third, systems of the present disclosure eliminate the need for extensive assembly or clamping by end users by employing an array of clamping elements holding the assembly together, reducing the risk of user errors that may lead to system failures.

Turning to FIGS. 4-7, tangential flow filtration cassette system 700 includes a filtration cassette 710 partially or fully enclosed by a flexible and/or disposable bag 720. Front and back sides of the cassette 710 and bag 720 are sandwiched between a rear end plate 740 and a front end plate 745 which operate together to seal the bag 720 and/or the cassette 710. The assembly is held in place by mateable first and second clamping elements 730, 735, which are disposed about the front and rear end plates 740, 745 and which apply a retentive force to the assembly, allowing it to withstand forces applied by internal fluid flows during operation. Systems 700 according to these embodiments can be provided unassembled, partially assembled or fully assembled to end users.

An exemplary TFF system 700 according to this disclosure will include a filtration cassette 710, substantially as described above. Filtration cassettes 710 according to the present disclosure will generally include a stack of 1-1000 (e.g., 1-10, 10-100, 100-250, etc.) interleaved membranes and channel seals (e.g., comprising a screens, thermoset, and/or thermoplastic adhesive material) defining alternating feed and filtrate channels. As described above, feed and filtrate screens at least partially define individual feed/retentate, and filtrate channel layers within the cassette.

Atop the TFF cassette 710 and bag 720, the front end plate 745 comprises a fluid manifold with a feed port 745a is disposed to fluidly seal the cassette. The rigid front end plate 745 may comprise a polymer such as polypropylene, high-density polyethylene (HDPE), or engineering-grade plastics engineering polymer such as polysulfone, polyethersulfone, polyether ketone, and be un-filled or filled making the material stiffer and less prone to creep or deflection. The front end plate 745 optionally includes one or more reinforcing ribs 745c, which act to strengthen the plate and reduce the likelihood of warping, which may result in fluid leaks. These ribs 745c may range in thickness from 0.5 inch to 5 inch. The straightness and rigidity of the front end plate 745 (and the rear end plate 740) is complemented, in some instances, by the use of more compliant materials in the bag 720 and the cassette 710, which may help these components to conform to surface irregularities in the end plates 740, 745 that may occur.

The use of a rigid front plate 745 as a fluid manifold provides a sealing surface of the bag 720 and surface of the TFF cassette 710, ensuring a robust seal there between the two parts. The rigid plate 745 is solid—i.e., non-porous and non-perforated—to limit fluid flows therethrough. In some cases, a bond is created between the plate 745 and the bag 720 and/or cassette 710 to ensure uniform sealing therebetween. The bond may be made in any suitable way, including without limitation using, a thermosetting adhesive, or a multi-part adhesive formulation. The bond, like the rigid plate 745 itself may be configured to conform to uneven regions or irregularities in the upper surface of the cassette 710.

The permeate collection bag 720 provides containment of the filtrate which is collected from the cassette. The bag rests on the surface of the first rigid plate and the surface of the cassette. A flexible gasket is optionally used to ensure a seal is formed between the mating parts, but is not shown in the figure.

At the bottom, the TFF cassette 720 is mated to the lower rigid plate manifold 740. Like the upper plate 745, the manifold 740 is manufactured using any suitable polymer, including without limitation polypropylene, high-density polyethylene (HDPE), or engineering-grade plastics. Manifold 300 is molded or machined to match the aperture layout and sealing surface of the TFF cassette 710. The manifold 740 may be between 0.5 and 5 inches thick.

Figure 7:
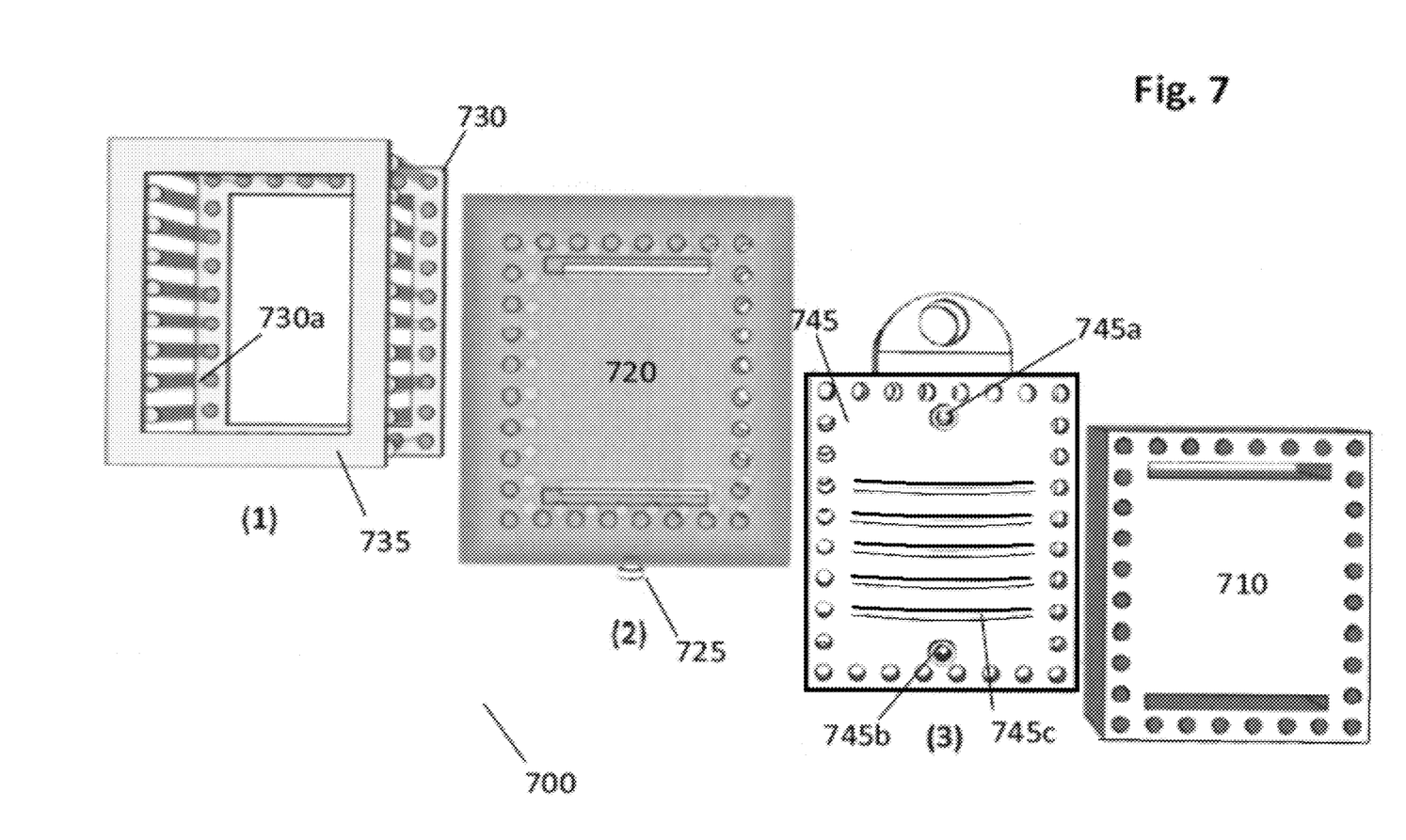
FIG. 7 shows a top-down view of the elements of a cassette-in-bag system according to an embodiment of this disclosure.

Feed and retentate flow paths 745a, 745b according to the embodiment shown in FIG. 7 extend through the front plate 745, e.g., through sterile connectors disposed thereupon. Permeate flows from the permeate channels of cassette 710 into the bag 720 and through a dedicated permeate flow path 725 connected (or connectable) to the bag 720. The front and/or rear plate 740, 745 may include features for attaching the system to a rack, skid or other support structure. For example, in the embodiment depicted in FIG. 7B, the front and rear end plates 740, 745 include an aperture sized to accommodate a hook or rod of a rack 750.

The first and/or second clamping elements 730, 735 can, in some cases, be configured to engage with other portions of the system 700, including the cassette 710, the bag 720 and the end plates 740, 745. For example, in the embodiments depicted in FIG. 7, the first clamping element 730 comprises a plurality of projections 730a, which extend through apertures in the cassette 710, bag 720, and/or first and second end plates 740, 745 and which projections 730a mate with corresponding sockets or receptacles (not shown) in the second clamping element 735. The first and second clamping elements 730, 735 may be reversibly engaged, e.g., by means of a press- or interference-fit, or permanently coupled, by means of an adhesive bond, a heat-weld, an ultrasonic weld, or the like. Alternatively, the first and second clamping elements 730, 735 may be integrally formed by injection molding, e.g., liquid injection molding using molds or jigs disposed on either side of the assembled filtration system 700, which would involving flowing uncured polymer into the molds or jigs and allowing the polymer to infiltrate apertures or fenestrations in the end plates 740, 745, the bag 720 and the cassette 710 so that, when cured, the clamping elements 730, 730a, 735 form a single molded polymer retaining structure.

An end user of system 700 can connect a first fluid conduit for input material (a fluid feed) to a connector disposed at the interface of the feed flow path 745a of the system 700, a second conduit for return material (retentate) to a second connector disposed at the interface of the retentate flow path 745b, and a third fluid conduit to the permeate flow path 725 disposed on the bag 720. In operation, fluid flows through the feed channel 745a into the cassette 710, where it is separated into filtrate or permeate and retentate. The retentate remains in the feed/retentate channels of the cassette 710 and returned via the retentate channel 745b. The permeate passes from the feed channels of the cassette 710 across the filtration membranes therewithin and into the permeate channels, where it can escape into the bag 720 and flow through the permeate flow path 725 into, e.g., a collection vessel.

One or more components of the system 700 can be formed of a polymer material, reducing weight and cost relative to fabricated metal parts. The bag 720 in particular can be formed of an elastomeric material such as silicone, thermoplastic polyurethane, etc. The end plates 740, 745 and the clamping members 730, 735 may also be formed from polymers such as polycarbonates, etc. The polymers can be any suitable grade, including engineering grade, and may be unfiled or filled if filling is necessary or desirable to preserve rigidity and/or minimize creep. Polymer components of systems 700 can be formed by any suitable methods known in the art, including injection molding, extrusion, bonding, etc.

Filtration systems 700 according to this disclosure have a number of potential advantages over other system designs. The ability to provide a partially or fully pre-assembled system 700 reduces workflow for the end user and may advantageously reduce the risk of incorrect assembly of component parts, thereby reducing the risk of failure due to user errors in assembly. Additionally, by collecting permeate flows in the bag 720, permeate flow paths within the cassette do not need be sealed from the outside, simplifying the design and manufacture of TFF cassettes described herein.

In those instances where a TFF system 700 is provided pre-assembled or finished, it may be desirable to apply compressive force to the assembled system prior to packing and shipping, and/or prior to or during the process of engaging the clamping members 730, 735 (e.g., applying compressive force prior to or during an injection molding process. Compressive force may be applied in a single compression cycle, or over multiple compression cycles.

Conclusion

All publications, patents, and patent applications mentioned herein are hereby incorporated by reference in their entirety as if each individual publication, patent or patent application was specifically and individually indicated to be incorporated by reference. In case of conflict, the present application, including any definitions herein, will control. Those skilled in the art will recognize or be able to ascertain using no more than routine experimentation, many equivalents to the specific embodiments described herein. Such equivalents are intended to be encompassed by the following claims.

The invention claimed is:

1. A tangential flow filtration system, comprising:
   a vessel;
   a tangential flow filtration cassette comprising a plurality of permeate channels, the tangential flow filtration cassette substantially enclosed within the vessel such that a permeate flow from each end of the plurality of permeate channels flows into the vessel;
   first and second end plates disposed about first and second sides of the tangential flow filtration cassette and the vessel, the first and second end plates positioned to form a fluid-tight seal with at least one of the tangential flow filtration cassette and the flexible vessel; and
   a clamping mechanism including a first clamping element disposed adjacent to the first end plate, a second clamping element disposed adjacent to the second end plate, and a plurality of projections coupling the first clamping element to the second clamping element, the plurality of projections extending through a plurality of openings formed in the first and second end plates, the vessel and the tangential flow filtration cassette.

2. The tangential flow filtration system of claim 1, wherein the vessel is elastically deformable.

3. The tangential flow filtration system of claim 1, wherein (a) the tangential flow filtration cassette comprises a plurality of interleaved retentate channels with the plurality of permeate channels, the interleaved retentate and permeate channels separated by at least one filtration membrane, (b) the retentate channels are in fluid communication with a feed port and a retentate port of the tangential flow filtration cassette and are fluidly sealed from the vessel, and (c) the permeate channels are in fluid communication with the vessel.

4. The tangential flow filtration system of claim 3, wherein each retentate channel comprises sealed ends between the retentate channel and the vessel.

5. The tangential flow filtration system of claim 1, wherein the tangential flow filtration cassette comprises a plurality of layered membranes, each layered membrane comprising two slotted fenestrations at opposing ends of each layered membrane.

6. The tangential flow filtration system of claim 5, wherein alternating layered membranes further comprise a seal disposed about each of the two slotted fenestrations.

7. The tangential flow filtration system of claim 5, wherein alternating layered membranes further comprise a seal disposed along opposing ends of each alternating layer outside of the two slotted fenestrations.

8. The tangential flow filtration system of claim 1, wherein the first end plate includes one or more reinforcing ribs extending therefrom.

9. The tangential flow filtration system of claim 1, wherein the first and second end plates are manufactured from a polymer.

10. The tangential flow filtration system of claim 9, wherein the first and second end plates are non-porous and non-perforated to prevent fluid flow therethrough.

11. The tangential flow filtration system of claim 1, wherein the first end plate includes a fluid manifold with a feed port, the fluid manifold providing a sealing surface between the vessel and an outer surface of the cassette.

12. The tangential flow filtration system of claim 1, wherein the first end plate includes a feed flow path and a retentate flow path extending therethrough so that permeate flows from the cassette and into the vessel.

13. The tangential flow filtration system of claim 1, wherein the first and second end plates are bonded to the vessel.

14. The tangential flow filtration system of claim 1, wherein one of the first and second end plates is configured to attach the system to a support structure.

15. A tangential flow filtration system comprising:
   a tangential flow filtration cassette, comprising:
      a stack of interleaved layers defining at least one feed channel and at least one filtrate channel, the stack of interleaved layers comprising:
         a membrane comprising first and second elongate fenestrations disposed at first and second ends thereof;
         a feed channel seal disposed on a first side of the membrane, the feed channel seal defining an enclosed membrane area comprising the first and second elongate fenestrations; and
         first and second filtrate channel seals disposed on a second side of the membrane opposite the first side, the first and second filtrate channel seals disposed about each of the first and second elongate fenestrations thereby sealing the first and second elongate fenestrations from the corresponding filtrate channel;
   a flexible vessel enclosing at least a portion of the tangential flow filtration cassette, the flexible vessel comprising a permeate outlet;

first and second end plates disposed about first and second sides of the tangential flow filtration cassette and the flexible vessel, the first and second end plates positioned to form a fluid-tight seal with at least one of the tangential flow filtration cassette and the flexible vessel, at least one of the first and second end plates defining a fluid inlet and a fluid outlet aligned with the elongate apertures of the tangential flow filtration cassette; and a clamping mechanism including a first clamping element disposed adjacent to the first end plate, a second clamping element disposed adjacent to the second end plate, and a plurality of projections coupling the first clamping element to the second clamping element, the plurality of projections extending through a plurality of openings formed in the first and second end plates, the flexible vessel and the tangential flow filtration cassette.

16. The tangential flow filtration cassette of claim 15, wherein the tangential flow filtration cassette includes an outer body defining an exterior, the at least one feed channel including a plurality of feed channels, at least one of the plurality of feed channels being fluidly sealed from the n exterior of the cassette but is open to each of the first and second elongate fenestrations, and the at least one filtrate channel is open to the exterior of the cassette but sealed from both the first and second elongate fenestrations.

17. The tangential flow filtration cassette of claim 15, further comprising a feed screen configured to substantially fill a volume of the enclosed membrane area defined by the feed channel seal.

18. The tangential flow filtration cassette of claim 15, further comprising a filtrate screen configured to substantially fill a volume of the filtrate channel outside of the first and second filtrate channel seals.

19. The tangential flow filtration system of claim 15, wherein the flexible vessel comprises a fluid connector that is reversibly connectable to a conduit for permeate.

\* \* \* \* \*